(12) United States Patent
Mueller

(10) Patent No.: US 9,124,176 B2
(45) Date of Patent: Sep. 1, 2015

(54) VOLTAGE CONVERTER COMPRISING A STORAGE INDUCTOR WITH ONE WINDING AND A STORAGE INDUCTOR WITH TWO WINDINGS

(71) Applicant: SMA Solar Technology AG, Niestetal (DE)

(72) Inventor: Burkard Mueller, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 141 days.

(21) Appl. No.: 13/892,475

(22) Filed: May 13, 2013

(65) Prior Publication Data

US 2013/0249515 A1 Sep. 26, 2013

Related U.S. Application Data

(63) Continuation of application No. PCT/EP2011/069979, filed on Nov. 11, 2011.

(30) Foreign Application Priority Data

Nov. 11, 2010 (DE) .......................... 10 2010 060 508

(51) Int. Cl.
*H02M 3/158* (2006.01)
*H02M 1/32* (2007.01)
(Continued)

(52) U.S. Cl.
CPC ............. *H02M 3/158* (2013.01); *G05F 1/618* (2013.01); *H02M 1/32* (2013.01); *H02M 1/4208* (2013.01); *H02M 3/33576* (2013.01);
(Continued)

(58) Field of Classification Search
CPC ..... H02M 3/158; H02M 1/4208; H02M 3/32; H02M 7/217; H02M 7/797; H02M 11/00
See application file for complete search history.

(56) References Cited

U.S. PATENT DOCUMENTS

| 4,937,726 A * | 6/1990 | Reustle .................... 363/21.12 |
| 2008/0037290 A1* | 2/2008 | Suzuki et al. .................. 363/17 |

FOREIGN PATENT DOCUMENTS

WO 02089303 A1 11/2002

OTHER PUBLICATIONS

Sahid, M.R.; Yatim, A.H.M; Taufik, T.; "A new AC-DC converter using bridgeless SEPIC"; IECON 2010—36th Annual Conference on IEEE Industrial Electronics Society Publication: Nov. 7-10, 2010, pp. 286-290.
Shoyama, M.; Ge Li; Ninomiya, T.: "Balanced switching converter to reduce common-mode conducted noise"; IEEE Transactions on Industrial Electronics; vol. 50, Issue: 6; Publication Year: 2003, pp. 1095-1099.
(Continued)

*Primary Examiner* — Timothy J Dole
*Assistant Examiner* — Ishrat Jamali
(74) *Attorney, Agent, or Firm* — Eschweiler & Associates, LLC

(57) ABSTRACT

A circuitry includes first, second, and third switching elements, first and second storage inductors, two connector pairs, and first and second intermediate potential points. The second storage inductor includes first and second windings. The first intermediate potential point is connected to a first connector of the first connector pair via the first storage inductor, to the second connector of the first connector pair via the third switching element, and to the second intermediate potential point. The second intermediate potential point is connected to the first connector of the second connector pair via a series connection of the first switching element and the first winding of the second storage inductor, and to the second connector of the second connector pair via a series connection of the second switching element and the second winding of the second storage inductor.

16 Claims, 3 Drawing Sheets

(51) Int. Cl.
*H02M 1/42* (2007.01)
*H02M 7/217* (2006.01)
*H02M 7/797* (2006.01)
*H02M 11/00* (2006.01)
*H02M 3/335* (2006.01)
*G05F 1/618* (2006.01)

(52) U.S. Cl.
CPC ............ *H02M 7/217* (2013.01); *H02M 7/797* (2013.01); *H02M 11/00* (2013.01)

(56) References Cited

OTHER PUBLICATIONS

International Search Report and Written Opinion of the International Searching Authority dated Feb. 13, 2012 for International Application No. PCT/EP2011/069979. 13 Pages.

* cited by examiner

VOLTAGE CONVERTER COMPRISING A STORAGE INDUCTOR WITH ONE WINDING AND A STORAGE INDUCTOR WITH TWO WINDINGS

REFERENCE TO RELATED APPLICATIONS

This application is a continuation of International application number PCT/EP2011/069979 filed on Nov. 11, 2011, which claims priority to German application number 10 2010 060 508.5 filed on Nov. 11, 2010.

FIELD

The disclosure relates to an electric circuitry for a voltage converter comprising three switching elements, two storage inductors and two pairs of connectors, and to methods of use of such an electric circuitry. More particular, the disclosure relates to a circuitry for a voltage converter in the field of power electronics, i.e., to a circuitry through which an electric current flows in order to transfer electric power between the two pairs of connectors.

BACKGROUND

For designing a voltage converter with protection against reversed polarity, it is known to have a diode full bridge rectifier between the input side connectors and the actual voltage converter. This circuit design causes conduction losses within the diodes. Additionally, the input voltage between the input side connectors needs to be distinctly above twice the bias voltage of the diodes. The reference between the potentials at the input side connectors and the output side connectors of such a voltage converter is undefined; and a power flow may happen unidirectionally only from the input side connectors to the output side connectors.

The known circuitry described above may also be used for forming a power factor optimized AC/DC converter by using the input side connectors not for a DC input voltage of unknown polarity but for an AC input voltage. The disadvantages mentioned above for the known circuitry also occur with this application.

Further, a so-called "Bridgeless Power Factor Correction" stage, also called a "Bridgeless PFC" stage is known for designing a power factor optimized AC/DC converter. Therein a combined diode/transistor full bridge is provided, whereto the input side AC voltage is connected via one or more inductors. In addition to the disadvantages mentioned for the AC/DC converter as described above, this circuitry exhibits the further disadvantage that the DC output voltage between the output side connectors may not get lower than the peak value of the input side AC voltage, as long as no additional DC/DC converter is provided.

A four quadrant chopper (4 QC) in the form of a full bridge made of switches with parallel diodes, in which each of the half bridges is connected to one of the output side connectors via an inductor and which is, for example, known for controlling a DC motor, has the disadvantages that the output voltage can never exceed the input voltage without a further DC/DC converter, and that the reference between the potentials at the input side connectors and the output side connectors is not defined.

The disadvantage of the undefined reference between the potentials at the input side connectors and the output side connectors is overcome by a four quadrant chopper with a half bridge in combination with a split input voltage, wherein one output side connector is connected to the voltage centre point of the split input voltage via an inductor. In this case, however, the output voltage can never exceed the split input voltage, i.e., one half of the input voltage, and additional effort is necessary for generating the split input voltage.

For an inverter feeding electric energy into an AC power grid, a full bridge of actively controlled switches with parallel diodes, in which the centre points of the two half bridges are connected to the output side connectors via inductors, is known. The disadvantages of this known circuitry are the variable reference between the potentials at the input side and the output side connectors, and that the input DC voltage has to be at minimum as high as the grid peak voltage if no additional DC/DC converter is to be used.

When using a half bridge in combination with a split input voltage in an inverter for feeding electric energy into an AC power grid, the disadvantage occurs that the input DC voltage has to be at minimum as high as twice the grid peak voltage. Further, the effort for generating the split supply voltage is necessary.

There still is a need for a circuitry for a voltage converter that may be used as a DC/DC converter with protection against reversed polarity but also may be used in other DC/DC, DC/AC or AC/DC converters while avoiding the described disadvantages of prior art voltage converters.

SUMMARY

One embodiment of the present disclosure provides a power electronic circuit for a voltage converter that comprises a first switching element, a second switching element, and third switching element. The circuit further comprises a first storage inductor with one winding, and a second storage inductor with a first winding and a second winding, those first and second windings being magnetically coupled to each other; a first connector pair consisting of or comprising a first connector and a second connector, and a second connector pair consisting of or comprising a first connector and a second connector. Still further, the circuit comprises a first intermediate potential point and a second intermediate potential point. The first intermediate potential point has a first connection to the first connector of the first connector pair via the first storage inductor, a second connection to the second connector of the first connector pair via the third switching element, and a third connection to the second intermediate potential point, either directly or via a capacitor. The second intermediate potential point has a first connection to the first connector of the second connector pair via a series connection of the first switching element and the first winding of the second storage inductor, and a second connection to the second connector of the second connector pair via a series connection of the second switching element and the second winding of the second storage inductor. At least one of a connection between the first connector of the first connector pair and the first connector of the second connector pair and a connection between the second connector of the first connector pair and the second connector of the second connector pair exists and is implemented either directly or via a capacitor. At maximum one of either the connection between the first connector of the first connector pair and the first connector of the second connector pair, or the connection between the second connector of the first connector pair and the second connector of the second connector pair, or the third connection of the first intermediate potential point to the second intermediate potential point is implemented as a direct connection.

In further embodiments the present disclosure provides a DC/DC converter with protection against reversed polarity, a power factor optimized AC/DC converter, an AC/DC converter, a four quadrant chopper and a bidirectional DC/AC converter, each being based on a specialized embodiment of the circuitry of the present disclosure.

Other features and advantages of the present disclosure will become apparent to one with skill in the art upon examination of the following drawings and the detailed description. It is intended that all such additional features and advantages be included herein within the scope of the present disclosure, as defined by the claims.

BRIEF DESCRIPTION OF THE DRAWINGS

The disclosure will be better understood with reference to the accompanying drawings. In the drawings, like reference numerals designate corresponding parts throughout the several views.

DETAILED DESCRIPTION

Figure 1:
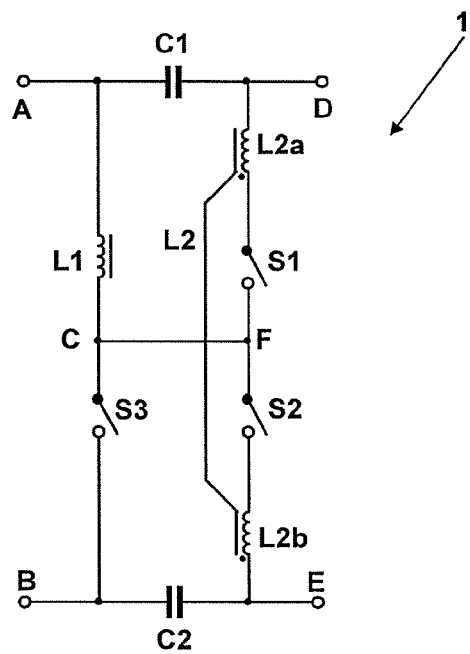
FIG. 1 illustrates the construction of the circuitry of the present disclosure.

When a first switching element, a second switching element and a third switching element, a first storage inductor and a second storage inductor, a first pair of connectors and a second pair of connectors, a first connector and a second connector, a first intermediate potential point and a second intermediate potential point, or first, second and third connections are mentioned in the following description, the adjectives first, second and third are used only for differentiating between the listed parts of the circuitry. They are not intended to indicate any rank, order or direction between these parts.

Further, the term "switching element" does not necessarily designate a switch that may be switched actively by an external signal between an on state and an off state or vice versa. It may, in principle, also designate a passive switching element, like, for example, a diode. Any switching element having an actively switchable switch may additionally comprise a parallel diode in addition to the, like it is, for example, intrinsically provided in a MOSFET semiconductor switch.

A circuitry for a voltage converter comprises first, second, and third switching elements, first and second storage inductors, two connector pairs, and first and second intermediate potential points. The second storage inductor comprises first and second windings that are magnetically coupled to each other. The first intermediate potential point is connected to a first connector of the first connector pair via the first storage inductor, to the second connector of the first connector pair via the third switching element, and to the second intermediate potential point either directly or via a capacitor. The second intermediate potential point is connected to the first connector of the second connector pair via a series connection of the first switching element and the first winding of the second storage inductor, and to the second connector of the second connector pair via a series connection of the second switching element and the second winding of the second storage inductor. Additionally, at least one of a connection between the first connector of the first connector pair and the first connector of the second connector pair and a connection between the second connector of the first connector pair and the second connector of the second connector pair exists and is implemented either directly or via a capacitor. At maximum one of either the connections between the first connector of the first connector pair and the first connector of the second connector pair, or between the second connector of the first connector pair and the second connector of the second connector pair, or between the first intermediate potential point and the second intermediate potential point is implemented as a direct connection. All other connections between the two intermediate potential points, the first connectors of the two connector pairs and the second connectors of the second connector pairs are, if present, implemented via a capacitor. It is possible to have all two or three connections implemented by way of a capacitor.

In one embodiment the first and the second switching elements each comprise an actively switchable switch, i.e. a switch that is switchable or may be operated by means of an external signal. Additionally, the first and the second switching elements may each comprise a diode in parallel to the switch. In this case, either the anodes or the cathodes of both diodes are connected to the second intermediate potential point. This means that no current may flow via the two diodes between the two connectors of the second connector pair, as it is always blocked by one of these two diodes.

The third switching element may exclusively consist of a passively switching diode in one embodiment. This diode is connected to the first intermediate potential point with its anode, if any diodes of the first and the second switching elements are connected to the second intermediate potential point with their cathodes; or it is connected to the first intermediate potential point with its cathode, if any diodes of the first and the second switching elements are connected to the second intermediate potential point with their anodes.

The third switching element may alternatively or additionally to the diode also comprise an actively switchable switch, i.e. a switch that is switchable by means of an external signal.

In the series connection of the first switching element and the first winding of the second storage inductor as well as in the series connection of the second switching element and the second winding of the second storage inductor the respective switching element is arranged between the second intermediate potential point and the winding in one embodiment.

When the first and second switching elements are closed, i.e. conductive, the second storage inductor of the circuitry according to the present disclosure acts as an inductive voltage divider between the connectors of the second connector pair. To achieve a symmetric voltage division with regard to the second intermediate potential point, the second storage inductor has to be symmetric with regard to its windings, wherein this symmetry refers to the entire construction of the second storage inductor including a core that is common to both of its windings.

The way how the three switching elements of the circuitry according to the present disclosure are controlled actively or switch passively depends on the use of the circuitry. These different uses also result in different functions of the circuitry according to the present disclosure.

When using the new circuitry as a DC/DC converter with protection against reversed polarity, the connectors of the second connector pair are provided to be connected to an input DC voltage that may have an arbitrary polarity. Independently of the actual polarity of the input DC voltage, an output DC voltage with a fixed polarity is provided at the connectors of the first connector pair, if a controller clocks the switches of the first switching element and the second switching element, which both comprise a diode connected in parallel to the switch, with one and the same external signal. The third switching element may be a passively switched diode or a switch that is actively switched in a manner like such a diode. In fact only that one of the first and second switching elements is opened actively by the external signal operating the switches of the first and second switching element, the parallel diode of which is blocking (i.e. is not conductive), due to the polarity of the applied input voltage. The respective other switching element is conductive anyway, since its parallel diode is conductive, due to the polarity of the applied input voltage, thus, it does not need to be opened actively by the external signal that operates the switches of the first and second switching element. It depends on the polarity of the input voltage for which of the first and second switching elements this applies. One advantage is that a DC/DC converter with protection against reversed polarity according to the present disclosure practically may be operated even down to input voltages close to zero Volts. Further, the input DC voltage and the output DC voltage may have a common reference between their potentials. To achieve this, the respective connectors of the first and second connector pairs have to be connected directly to each other. On the other hand, potential relation with an offset is possible, if these connections are implemented in a capacitive way. The switches of the first and the second switching elements are operated by the same external signal. Thus, only one driver is necessary, which does not mean additional effort as compared to the known DC/DC converters with protection against reversed polarity described before. The control signal is entirely independent of the polarity of the input voltage in one embodiment.

Further, the circuitry according to the present disclosure may be used as a power factor optimized AC/DC converter, also known as PFC stage. The details of this use correspond to the DC/DC converter with protection against reversed polarity described in the previous paragraph, except that an AC voltage is applied to the connectors of the second connector pair. By means of an appropriate modulation of the duty cycle at which the controller operates the switches of the first and the second switching elements, the power factor of the input side AC current may be controlled to be 1, and the DC output voltage may be adjusted to compensate for different amplitudes of the AC input voltage. If the third switching element of this AC/DC converter does not only comprise a diode but also an actively operable switch, a bidirectional operation of the AC/DC converter is possible, i.e., electric energy may also be transferred from the DC voltage side to the AC voltage side. For this purpose, depending on the polarity of the input voltage one of the switches of the first and second switching elements has to be closed whereas the other switch of the first and second switching elements and the switch of the third switching element have to be alternatingly operated at a high frequency. (Here and in the following "operated at a high frequency" refers to an operation at a frequency much higher than the frequency of any AC voltage connected to the circuitry of the present disclosure. Typically this frequency is a range of some kHz.)

The circuitry according to the present disclosure may also be used as a four quadrant chopper, wherein the connectors of the first connector pair are provided for a DC voltage and wherein the connectors of the second connector pair are, for example, connected to a DC electric machine. A controller of such a 4 QC then closes one of the switches of the first and second switching elements and clocks the other of these switches and the switch of the third switching element in a complementary manner at a high frequency.

The new circuitry also allows for a use as a bidirectional AC/DC converter, for example, to provide an inverter for feeding into a power grid. In that case the connectors of the first connector pair are provided for a DC voltage, like, for example, an output voltage of a photovoltaic generator, and the connectors of the second connector pair are provided for an AC voltage, like, for example, of an AC power grid into which electric energy is to be fed. A controller of such an AC/DC converter closes one of the switches of the first or second switching elements for one half wave of the AC voltage and clocks the other of these switches and the switch of the third switching element in a complementary manner. Thus, the AC/DC converter is able to feed back, and, as a result, it is also able to provide reactive power. It may furthermore transfer electric energy to the AC voltage, even if this energy is provided at a smaller DC voltage than the peak value of the AC voltage.

In all embodiments and uses of the circuitry according to the present disclosure, the switches are reasonably implemented as transistors of a same polarity and with an anti-parallel diode each, wherein the anti-parallel diode, like for example in a MOSFET, may also be intrinsic. The transistors of the first and the second switching elements may be arranged in such a way that their emitter (or source) connectors are connected to each other, whereas the transistor of the third switching element is connected to the first storage inductor at its collector/drain. This embodiment has the advantage that a single supply voltage with reference to the emitter/source of the third switching element may supply a driver of the third switching element directly and drivers of the first and second switching elements via a bootstrap.

The voltage transfer ratio achieved by the circuitry of the present disclosure results from the duty cycle at which the controller operates the switches. If the switch of the third switching element is clocked at a duty cycle D, and if one of the switches of the first and second switching elements is correspondingly operated at the duty cycle 1-D, while the other of the switches of the first and second switching elements is closed or its parallel diode is conductive, the voltage transfer ratio in continuous operation is: U sec/U prim=2D/(1−D), wherein U prim is the absolute value of the voltage between the connectors of the first connector pair and U sec is the absolute value of the voltage between the connectors of the second connector pair.

Capacitors may be provided between both the first and the second connectors of the connector pairs to minimize a current ripple at the connectors of the second connector pair. For a minimum current ripple at the connectors of the first connector pair, any capacitance between the first connectors of the first and second connector pair should be omitted.

In operation of the circuitry of the present disclosure as a grounded inverter, only the current ripple at the connectors of the first connector pair can be minimized. For this purpose, either the first or the second connectors of the two connector pairs are directly connected, and the connection between the first and the second intermediate potential point is realized via a capacitor.

The new circuitry thus provides a universal voltage converter that may be implemented as bidirectional at a very low effort, that may selectively operate inverting or non-inverting, and that may operate as a boost or buck converter in both directions, at the same time being simple and available at low cost. Further, a galvanic connection between the first or the second connectors of the first and the second connector pair is possible, such that, for example, in operation as an inverter at a grounded power grid, one pole of the DC voltage source may be connected to the neutral conductor and may be grounded this way.

Referring now in greater detail to the drawings, the circuitry 1 depicted in FIG. 1 comprises a first connector pair including a first connector A and a second connector B as well as a second connector pair including connectors D and E. An intermediate potential point C is connected to the connector A via a storage inductor L1 having only one winding and to the connector B via a switching element S3. Further, the intermediate potential point C is connected to an intermediate potential point F between the connectors D and E. This connection is a direct connection here. In one embodiment the intermediate potential point F is connected to the connectors D and E in each case via a series circuit consisting of a switching element S1 or S2, respectively, and a winding L2a or L2b, respectively, of a second storage inductor L2. The two windings L2a and L2b of the second storage inductor L2 are provided on a common core and are, thus, magnetically coupled. The common core of the windings L2a and L2b has a stray inductance that is as small as possible, i.e., a construction like it is, for example, typical for a transformer of a flyback converter. The storage inductor L2 is symmetric with regard to its two windings L2a and L2b in such a way that it provides an inductive voltage divider for dividing a voltage applied between the connectors D and E into equal halves in case that the switching elements S1 and S2 are conductive. The connectors A and D on the one hand and the connectors B and E on the other hand are connected to each other here via capacitors C1 and C2, respectively. At least two of the connections A-D, C-F and B-E exist with the circuitry 1 of the present disclosure and at maximum one of these connections is implemented as a direct connection. i.e., instead of the connection C-F, which is designed to be direct here, one of the connections A-D or B-E could be implemented as being direct, i.e., without a capacitor, if the connection C-F would be implemented via a capacitor. The switching elements S1 and S2 each comprise at least one actively operable switch. The switching element S3, however, may as well be implemented as a passively switching device, for example, as a diode. The active switches of the switching elements S1 and S2 as well as S3, if provided as actively switchable, are operated depending on the use of the circuitry 1 by means of a controller, which is not depicted here.

Figure 2:
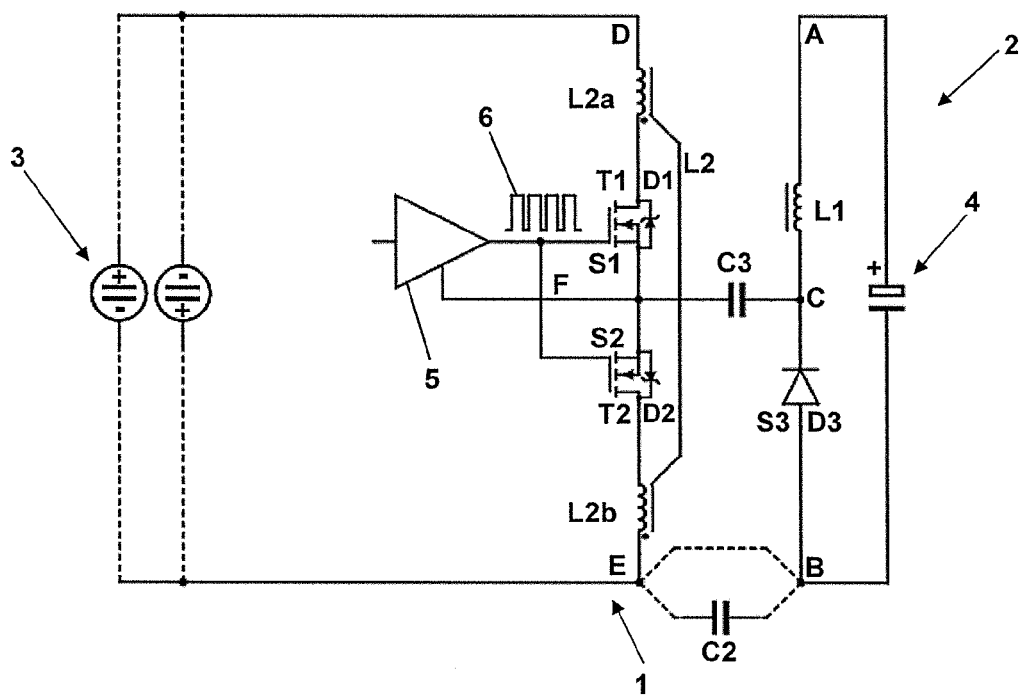
FIG. 2 illustrates the use of the circuitry of the present disclosure as a DC/DC converter with protection against reversed polarity.

FIG. 2 illustrates the use of the circuitry 1 as a DC/DC converter 2 with protection against reversed polarity to which an input voltage 3 of unknown polarity is connectable and which, independently of the polarity of the input voltage 3, provides an output voltage 4 of a fixed polarity. This fixed polarity is defined by the passing direction of a diode D3 forming the switching element S3, which is connected to the intermediate potential point C with its cathode here. The switching elements S1 and S2 are each implemented as transistors T1 and T2, respectively, with anti-parallel diodes D1 and D2, respectively, which are each connected to the intermediate potential point F with their anodes. The transistors T1 and T2 are simultaneously clocked by a signal 6 from a driver 5. Depending on the polarity of the input voltage, this operation has no direct effect on either one or the other of the two switching elements S1 and S2, since the associated anti-parallel diode D1 or D2 is oriented in conducting direction anyway, however, on the other hand this does not harm. By operating the switch of the other switching element S1 or S2, respectively, the amplitude of the output voltage is determined with respect to the input voltage.

According to FIG. 2, the intermediate potential points C and F are connected to each other via a capacitor C3. With regard to the connection of the connectors E and B, it is indicated that it may be implemented either directly or via the capacitor C2 to realize either a common potential reference or a potential offset.

The signal 6 from the driver 5 is completely independent of the polarity of the input voltage 3. That means, in the DC/DC converter 2 the circuitry 1 is operated completely independent of the polarity of the input voltage 3 but nevertheless always provides an output voltage 4 of the same polarity.

Figure 3:
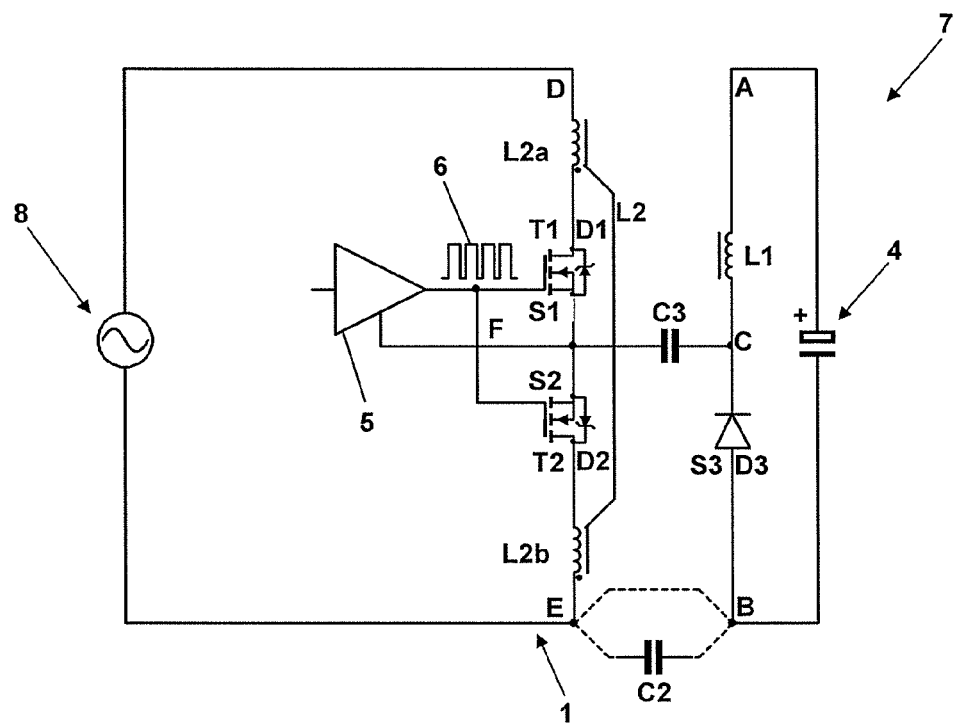
FIG. 3 illustrates the use of the circuitry of the present disclosure as a PFC stage.

A power factor optimized AC/DC converter 7 comprising the circuitry 1 is illustrated in FIG. 3. Here, the circuitry 1, including its basic control, completely corresponds to the embodiment of FIG. 2. However, an AC input voltage 8 is applied to the connectors D and E, out of which the DC output voltage 4 of a fixed polarity is fed. For this purpose, the transistors T1 and T2 are also operated simultaneously by means of the signal 6. The duty cycle of the signal 6 is varied in such a way that the power factor of an input current between D and E is controlled to a value of 1 and that a desired voltage transfer ratio between the input AC voltage 8 and the DC output voltage 4 is adjusted.

When the diode D3 is replaced by a controllable transistor or when the diode of the switching element S3 is supplemented with such a controllable transistor, the AC/DC converter may also be operated bidirectionally, i.e., electric power may be transferred from a DC voltage at the connectors A and B to an AC voltage at the connectors D and E. In this case, the two switching elements S1 and S2 have to be made conductive alternatingly, each time for one half wave of the AC voltage, whereas the switch of the switching element S1 or S2 that is not permanently conductive during the present half wave and the switch of the switching element S3 are alternatingly operated at a high frequency. Which one of the two switching elements S1 and S2 becomes conductive during a respective half wave of the AC voltage depends on the actually desired polarity of the input AC voltage 8 (or on a polarity dictated by a connected power grid).

In one embodiment, if all switching elements S1, S2 and S3 are realized only by switches, i.e. without parallel diodes, the polarity of the DC output voltage 4 may furthermore be defined by which of the switching elements S1 or S2 is alternatingly operated with the switching element S3, while the other one of the switching elements 51 and S2 is permanently closed.

Figure 4:
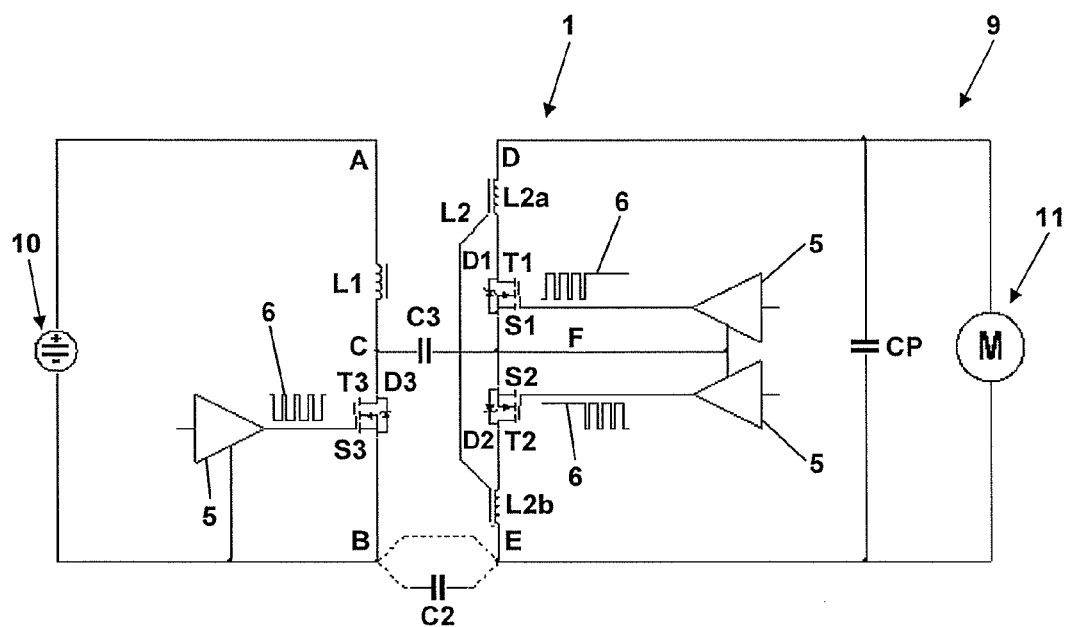
FIG. 4 illustrates the use of the circuitry of the present disclosure as a four quadrant chopper.

FIG. 4 illustrates a four quadrant chopper 9 connected between a DC voltage 10 and a DC electric machine 11, which may be operated both as a motor and a generator. In addition to the circuitry 1, a buffer capacitor CP is provided between the connectors D and E. The transistors T1, T2 and T3 are each controlled here by proprietary control signals 6 from associated drivers 5 and in such a way that always one of the transistors T1 and T2 is permanently conductive, while the other one and the transistor T3 are clocked at a high frequency in a complementary manner. By selecting the permanently conductive transistor T1 or T2, the relative polarity of the voltage at the electric machine 11 is defined with regard to the DC voltage 10, while the duty cycle of the complementary clocking of the other one of the transistors T1 and T2 and the transistor T3 defines the voltage transfer ratio of the circuitry 1 between the connectors A and B on the one hand and the connectors D and E on the other hand.

Figure 5:
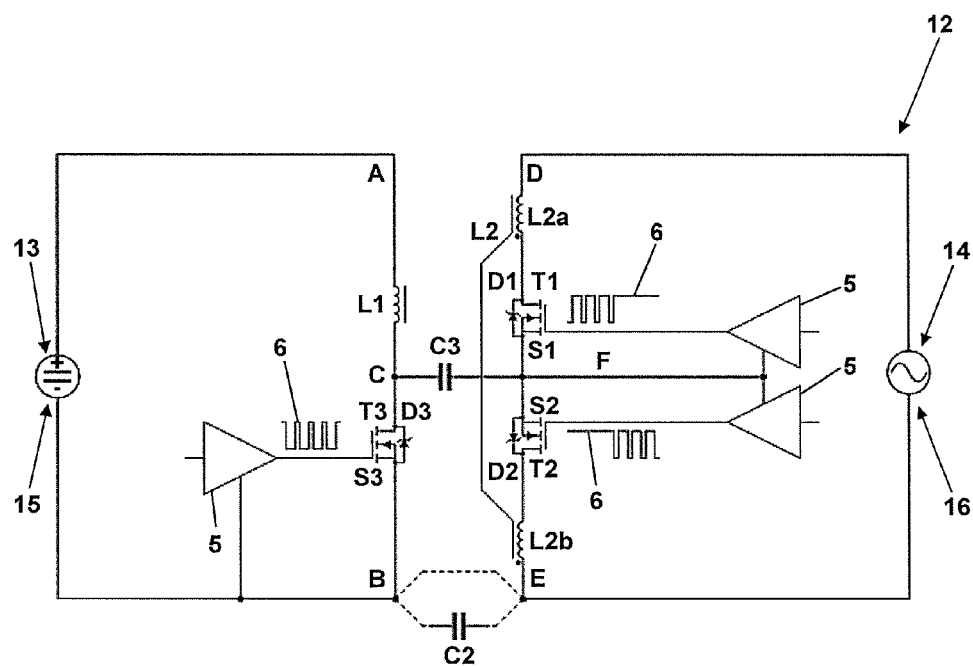
FIG. 5 illustrates the use of the circuitry of the present disclosure as an inverter for feeding electric energy into an AC power grid.

FIG. 5 illustrates a DC/AC converter 12 that is provided as an inverter for feeding electric power from a photovoltaic generator 13 into an AC power grid 14 but also allows for a bidirectional operation, i.e., a transfer of electric power from the side of an AC voltage 16 to the side of the DC voltage 15. Here, the construction and operation essentially correspond to FIG. 4. However, here the transistors T1 and T2 are alternatingly made conductive for one half wave of the AC voltage 16 by the control signals 6, and the transistor T1 or T2 that is not permanently conductive during the present half wave and the transistor T3 of the switching element S3 are clocked in a complementary manner at high frequency.

Many variations and modifications may be made to the embodiments of the disclosure without departing substantially from the spirit and principles of the invention. All such modifications and variations are intended to be included herein within the scope of the present disclosure, as defined by the following claims.

What is claimed is:

1. A circuitry for a voltage converter, the circuitry comprising:
   a first switching element, a second switching element, and a third switching element;
   a first storage inductor, and a second storage inductor, the second storage inductor comprising a first winding and a second winding that are magnetically coupled to each other;
   a first set of two electrical terminals consisting of a first terminal and a second terminal, and a second set of two electrical terminals consisting of a first terminal and a second terminal; and
   a first intermediate potential point and a second intermediate potential point;
   wherein the first intermediate potential point has:
      a first connection to the first terminal of the first set of two electrical terminals via the first storage inductor,
      a second connection to the second terminal of the first set of two electrical terminals via the third switching element, and
      a third connection to the second intermediate potential point, either directly or via a capacitor;
   wherein the second intermediate potential point has:
      a first connection to the first terminal of the second set of two electrical terminals via a series connection of the first switching element and the first winding of the second storage inductor, and
      a second connection to the second terminal of the second set of two electrical terminals via a series connection of the second switching element and the second winding of the second storage inductor; and
   wherein at least one of a connection between the first terminal of the first set of two electrical terminals and the first terminal of the second set of two electrical terminals and a connection between the second terminal of the first set of two electrical terminals and the second terminal of the second set of two electrical terminals exists and is implemented either directly or via a capacitor;
   wherein at maximum one of either:
      the connection between the first terminal of the first set of two electrical terminals and the first terminal of the second set of two electrical terminals, or
      the connection between the second terminal of the first set of two electrical terminals and the second terminal of the second set of two electrical terminals, or
      the third connection of the first intermediate potential point to the second intermediate potential point,
   is a direct connection.

2. The circuitry according to claim 1, wherein the first switching element and the second switching element each comprise an active switch that is configured to be switched by means of an external signal.

3. The circuitry according to claim 2, wherein the first switching element and the second switching element each further comprise a diode in parallel with the respective active switch.

4. The circuitry according to claim 3, wherein the diode of the first switching element and the diode of the second switching element are connected to the second intermediate potential point both with their same type of their electrodes.

5. The circuitry according to claim 4, wherein the third switching element comprises a diode, and wherein the diode of the third switching element is connected to the first intermediate potential point with the opposite type of its electrodes as compared to the same type of electrodes with which the diode of the first switching element and the diode of the second switching element are connected to the second intermediate potential point.

6. The circuitry according to claim 4, wherein the diode of the first switching element and the diode of the second switching element are connected to the second intermediate potential point both with their anodes.

7. The circuitry according to claim 6, wherein the third switching element comprises a diode, and wherein the diode of the third switching element is connected to the first intermediate potential point with its cathode.

8. The circuitry according to claim 3, wherein the circuitry is configured to form a DC/DC converter with protection against reversed polarity,
   wherein the terminals of the second set of two electrical terminals are configured to receive a DC input voltage, and
   wherein the terminals of the first set of two electrical terminals are configured to provide a DC output voltage; and
   further comprising a controller configured to simultaneously clock the active switch of the first switching element and the active switch of the second switching element.

9. The circuitry according to claim 3, wherein the circuitry is configured to form a power factor optimized AC/DC converter,
   wherein the terminals of the second set of two electrical terminals are configured to receive an AC input voltage, and
   wherein the terminals of the first set of two electrical terminals are configured to provide a DC output voltage; and
   further comprising a controller configured to simultaneously clock the active switch of the first switching element and the active switch of the second switching element at a high frequency.

10. The circuitry according to claim 3, wherein the circuitry is configured to form an AC/DC converter,
    wherein the third switching element comprises an active switch that is configured to be switched by means of an external signal,
    wherein the terminals of the second set of two electrical terminals are configured to couple to an AC voltage, and
    wherein the terminals of the first set of two electrical terminals are configured to couple to a DC voltage; and
    further comprising a controller configured to simultaneously clock the active switch of the first switching element and the second switching element and clock the active switch of the third switching element in a complementary manner.

11. The circuitry according to claim 3, wherein the circuitry is configured to form a four quadrant chopper, wherein the third switching element comprises an active switch that is configured to be switched by means of an external signal, wherein the terminals of the first set of two electrical terminals are configured to couple to a DC voltage, and wherein the terminals of the second set of two electrical terminals are configured to couple to a DC electric machine; and further comprising a controller configured to close one of the active switch of the first switching element and the active switch of the second switching element for some time, and clock an other of the active switch of the first switching element and of the second switching element and the active switch of the third switching element in a complementary manner.

12. The circuitry according to claim 1, wherein the third switching element comprises a diode.

13. The circuitry according to claim 1, wherein the third switching element comprises an active switch that is configured to be switched by means of an external signal.

14. The circuitry according to claim 1, wherein, both in the series connection of the first switching element and of the first winding and in the series connection of the second switching element and the second winding, the respective switching element is arranged between the second intermediate potential point and the respective winding of the second storage inductor.

15. The circuitry according to claim 1, wherein the second storage inductor is symmetric with regard to its first winding between the second intermediate potential point and the first terminal of the second set of two electrical terminals, on the one hand, and its second winding between the second intermediate potential point and the second terminal of the second set of two electrical terminals, on the other hand.

16. The circuitry according to claim 1, wherein the circuitry is configured to form a bidirectional DC/AC converter, wherein the third switching element comprises an active switch that is configured to be switched by means of an external signal, wherein the terminals of the first set of two electrical terminals are configured to couple to a DC voltage, and wherein the connectors of the second set of two electrical terminals are configured to couple to an AC voltage; and further comprising a controller configured to close one of the active switch of the first switching element and of the active switch of the second switching element for one half wave of the AC voltage, and alternatingly clock an other of the active switch of the first switching element and of the active switch of the second switching element and the active switch of the third switching element in a complementary manner at a frequency that is higher than a switching frequency of the one of the active switch of the first switching element and of the active switch of the second switching element.

* * * * *